Patented Jan. 28, 1947

2,414,951

UNITED STATES PATENT OFFICE 2,414,951

APPLICATION OF METAL SULFIDE CATALYSTS IN THE VAPOR PHASE TREATMENT OF MINERAL OILS

Zene V. Jasaitis, Los Angeles, and Donald D. Davidson, Long Beach, Calif., assignors to Shell Development Company, San Francisco, Calif., a corporation of Delaware No Drawing. Application November 6, 1945, Serial No. 627,095

6 Claims. (Cl. 196—24)

This invention relates to the application of solid hydrogenation-dehydrogenation catalysts containing as the predominant active constituent one or more metal sulfides. More particularly the invention relates to an improved method for the application of such catalysts for the treatment of mineral oils such as the various distillates obtained from petroleum, oil shale and the hydrogenation of coal and tar.

Two of the most important classes of hydrogenation-dehydrogenation catalysts are the sulfides and oxides of metals. These two classes of catalyst find wide application in the treatment of mineral oils due largely to the fact that they are not poisoned by small amounts of sulfur compounds normally found in such products. These two classes of catalysts are both used under low temperature conditions to hydrogenate unsaturated materials and sulfur compounds. In such use they are insensitive to sulfur compounds in the feed and retain their efficiencies over considerable periods of continuous operation. In most cases, however, it is desirable to operate at higher temperatures when substantial dehydrogenation and/or dehydrocyclization takes place, since under such conditions a large consumption of costly hydrogen is avoided and products of superior solvent properties and/or anti-knock properties are obtained (due to an appreciable conversion of non-aromatic hydrocarbon compounds in the feed to aromatic hydrocarbons). In this latter application these two classes of catalysts are not equivalent. The oxide catalysts quickly lose their effectiveness due to accumulation of carbonaceous deposits and must be frequently regenerated. When using such catalysts, therefore, the plant and reactors are specially designed for efficient and rapid regeneration, and regeneration of the catalyst is an integral part of the process.

The sulfide catalysts, on the other hand, usually become deactivated at a much slower rate. Also the regeneration of the sulfide catalysts is generally a rather complicated and time-consuming procedure. Consequently regeneration of the sulfide catalyst is carried out only at relatively infrequent periods and this does not as a rule warrant the inclusion of elaborate regeneration facilities as a part of the plant. Thus, the catalyst is often used until it is spent and then replaced by fresh catalyst. The spent catalyst can usually be regenerated in situ, but this requires taking the plant off stream for several days.

It is known that these sulfide catalysts, after becoming relatively inefficient in the dehydrogenation process, still have an appreciable hydrogenation ability and consequently it has been proposed to utilize such catalysts for the desulfurization of oils after they have lost efficiency in dehydrogenation and before regenerating them. This allows the catalyst to be usefully employed over a longer period of time before the plant must be shut down to allow for catalyst regeneration. However, the desulfurizing action of such spent catalysts is not nearly as complete as when using a fresh catalyst.

The object of the present invention is to provide a method whereby metal sulfide hydrogenation-dehydrogenation catalysts may be usefully employed a greater percentage of the time and to better advantage. An object of the invention is to provide a method of application of such catalysts wherein the percentage of time spent in regeneration of the catalyst is less. Another object of the invention is to provide a method of application of such catalysts wherein the maximum desulfurizing activity of these catalysts is utilized to advantage.

These and other objects are attained by employing such catalysts in the following repeated sequence of process steps.

1. Dehydrogenation of a relatively sulfur-free mineral oil to obtain an appreciable increase in aromatic content of said oil.
2. Removing of carbonaceous deposits from the catalyst by burning.
3. Desulfurization of a relatively sulfur-rich mineral oil under hydrogenation conditions.

The process of the invention is of general application in such cases where a mineral oil is converted in the vapor phase and in the presence of hydrogen with the aid of a metal sulfide catalyst. Therefore, it may be applied with a variety of mineral oils under a variety of conditions and with a variety of metal sulfide catalysts. It is particularly advantageous however where the catalyst contains as the predominating active constituent a sulfide of a molybdenum, tungsten, iron, cobalt or nickel or a mixture thereof, and particularly where the catalyst consists essentially of one or more of these constituents, i. e. it is not a supported type catalyst consisting largely of a carrier material.

In the first of the above-specified repeated sequence of steps the catalyst is used under dehydrogenation conditions for the dehydrogenation of a relatively sulfur-free mineral oil. In order to have dehydrogenation conditions the temperature must be above about 800° F. and is preferably between about 825° F. and 1000° F. The partial pressure of hydrogen should be at least ¾ of the total pressure, i. e. the mol ratio of recycled hydrogen should be at least 3:1 with respect to the hydrogen feed. The total pressure may vary under a very wide range but is preferably above about 300 p. s. i., for example 500–1000 p. s. i. The sulfur content of the feed used in the first step should be below 0.1% and preferably on the order of 0.01 to 0.05%. Under these conditions the process is carried out continuously for a considerable time, for example 200–1000 hours or more. During this period the activity of the catalyst gradually declines.

When the catalyst has declined in activity to the extent that the desired dehydrogenation is no longer obtained the first process step is concluded. At this point the temperature could be lowered to 800° F. or below and a high sulfur feed treated. However, such operation does not give optimum desulfurization and does not utilize the catalyst to the optimum advantage. Therefore, the catalyst is subjected to an incomplete regeneration treatment which comprises burning off carbonaceous deposits under controlled conditions. This regeneration treatment may be carried out with air or with air diluted with nitrogen or flue gas, but is preferably carried out using a mixture of air and steam. This treatment removes the bulk of the carbonaceous deposits without material loss of strength of the catalyst particles.

The catalyst at the conclusion of this second step is not regenerated in the sense that it has its original activity and is totally unsuited for continuation of step 1. Thus, if it is used again as in step 1 it is found that the activity for dehydrogenation is only about 70% of that of the fresh catalyst. Moreover, if the catalyst is first reduced the catalyst particles lose strength and many of them crumble to dust which plugs the catalyst bed. It is found, however, that the catalyst after the burning step is exceptionally active for effecting hydrogenation of sulfur compounds. Also, it is found that if a high sulfur mineral oil is treated with the catalyst under hydrogenation conditions following the burning treatment excellent desulfurization is effected without appreciable loss of strength of the catalyst particles due to reduction. Also, it is found that after employing the catalyst in this manner for a time it becomes substantially completely regenerated for the dehydrogenation of step 1. Consequently, after removing carbonaceous deposits from the catalyst by oxidation in step 2, the catalyst is immediately used in the third step of the process for the treatment of a high sulfur mineral oil under hydrogenation conditions. The temperature should be below 800° F. and preferably between about 400° F. and 800° F. The mol ratio of hydrogen to hydrocarbon is preferably above 3. The total pressure may vary over a very wide range but is preferably between about 400 and 1000 p. s. i. The mineral oil should contain at least 3% sulfur. Under these conditions the process may be carried out continuously for a considerable period while obtaining substantially complete desulfurization.

At the conclusion of step 3 the conditions are changed to dehydrogenation conditions. The low sulfur feed is substituted for the high sulfur feed and the cycle of steps is repeated until such time that the catalyst becomes permanently impaired to such an extent that its replacement is advisable.

An application of the process of the invention is illustrated by the following example:

The catalyst consists of pellets of a mixture of about two mols of nickel sulfide and about one mol of tungsten sulfide, the nickel sulfide being the major constituent on a mol basis. This catalyst is employed for the dehydrogenation of a fraction of petroleum rich in methylcyclohexane and relatively sulfur free (less than 0.10% sulfur). In this first step the catalyst is used continuously at a temperature between about 800° F. and 900° F. under a pressure of between about 500 and 800 p. s. i. and with about 7 mols of recycled hydrogen per mol of hydrocarbon feed. When the efficiency of the catalyst, as measured in terms of percent available methylcyclohexane dehydrogenated, has fallen the process is stopped and the catalyst is subjected to an air-plus-steam treatment under the following conditions:

| | |
|---|---|
| Steam flow vapor space velocity 60° F. per minute | 11–35 |
| Air flow vapor space velocity 60° F. per minute | 2–15 |
| Inlet oxygen concentration, % v | 1–10 |
| Temperature °F. inlet | 860–875 |
| Temperature °F. maximum hot zone | 1090–1115 |
| Temperature °F. average hot zone | 910–1060 |
| Reactor exit pressure p. s. i. g | 0 |

The catalyst without further treatment is then used for the catalytic desulfurization of a high sulfur petroleum fraction (15.6% sulfur) at a temperature between about 700° F. and 800° F. at a pressure between about 500 and 800 p. s. i. and with about 7 mols recycled hydrogen per mol of hydrocarbon feed. The desulfurization is essentially complete. After a period the temperature is raised and the relatively sulfur-free petroleum fraction is treated as described.

The dehydrogenation efficiency after returning to the first step of the cycle is found to be substantially equal to that of the fresh catalyst. If, on the other hand, the catalyst is reduced with hydrogen at the end of the air-plus-steam oxidation step the catalyst pellets tend to crumble and about 25% "fines" is produced. The dehydrogenation activity of the catalyst is only about 68% of that of the fresh catalyst.

As pointed out above, the catalyst, if reduced after the air-plus-steam oxidation, tends to lose strength and crumble. In order to minimize the danger of reduction during the third step of the process the sulfur content of the feed used in this step should be at least 3. Also, in order to minimize the danger of disintegration of the catalyst pellets due to a possible loss of strength it is desirable to pass the reactant vapors up through the catalyst bed in the third step. The processing in step 1 however may be carried out with the reactant vapors passing down through the catalyst bed.

In the above-described method of the invention the catalyst is usefully employed all of the time except for the relatively short time that is required to effect the oxidation in step 2. Also, the available desulfurization activity of the catalyst is fully utilized.

The invention claimed is:

1. In the application of a metal sulfide catalyst for the vapor phase treatment of mineral oils in the presence of hydrogen, the improvement which comprises employing the catalyst with the following repeated sequence of processing steps: (1) dehydrogenation at a temperature above about 800° F. of a relatively sulfur-free mineral oil containing less than 0.10% sulfur to obtain an appreciable increase in aromatic content of said oil; (2) removing carbonaceous deposits from the catalyst by burning; (3) desulfurization of a relatively sulfur-rich mineral oil containing at least 3% sulfur under hydrogenation conditions at a temperature below about 800° F.

2. Process according to claim 1 in which the metal sulfide catalyst contains as the predominating active constituent a sulfide of nickel.

3. Process according to claim 1 in which the metal sulfide catalyst contains as the predominating active constituent a sulfide of cobalt.

4. Process according to claim 1 in which the metal sulfide catalyst contains as the predominating active constituent a major mol amount of a sulfide of nickel in combination with a minor mol amount of a sulfide of tungsten.

5. Process according to claim 1 in which the metal sulfide catalyst contains as the predominating active constituent a sulfide of cobalt in combination with a minor amount of a sulfide of molybdenum.

6. Process according to claim 1 in which the catalyst is dispersed as a fixed bed through which the oil vapor is passed upflow during step 3.

ZENE V. JASAITIS.
DONALD D. DAVIDSON.